Aug. 11, 1936.  W. HUBBARD  2,050,531
PROCESS FOR MAKING SEPARATE BUILT-UP HEELS
Filed July 23, 1934  4 Sheets-Sheet 1

INVENTOR
William Hubbard
BY Martin & Rendell
ATTORNEYS

Aug. 11, 1936.  W. HUBBARD  2,050,531

PROCESS FOR MAKING SEPARATE BUILT-UP HEELS

Filed July 23, 1934  4 Sheets-Sheet 2

INVENTOR
William Hubbard
BY *Martin & Rendell*
ATTORNEYS

Fig. 11  Fig. 12  Fig. 19

Aug. 11, 1936.  W. HUBBARD  2,050,531
PROCESS FOR MAKING SEPARATE BUILT-UP HEELS
Filed July 23, 1934  4 Sheets-Sheet 4

INVENTOR
William Hubbard
BY Martin & Rendell
ATTORNEYS

Patented Aug. 11, 1936

2,050,531

UNITED STATES PATENT OFFICE 2,050,531

PROCESS FOR MAKING SEPARATE BUILT-UP HEELS

William Hubbard, Oppenheim, N. Y., assignor to Hubbard Heel Company, Inc., Dolgeville, N. Y., a corporation of New York Application July 23, 1934, Serial No. 736,452

4 Claims. (Cl. 12—147)

My present invention relates to a separate built-up heel for shoe, slippers and the like and to the processes of making built-up re-enforced heels and turned heels and to certain mechanism used therefor.

One purpose of this invention is to provide a separate built-up heel of new and improved form and construction and particularly to provide a separate built-up heel where the lifts or layers of leather or other heel-forming material except the final finishing ground-engaging lift commonly called in the trade the top lift are held together by reinforcing nails projecting from the next to the top lift through said lift and all the other lifts into and through the bottom and largest or shoe-engaging lift and further to have these nails radiate from said second or next to the top lift as they proceed towards and through the larger lower or bottom lift and furthermore to have the point ends of the said nails clinched over upon the outer surface of the said lower lift so as to make the nailing that much more secure and rigid and also to have the clinched or pointed ends of the nails preferably turned outwardly towards the adjacent sides and back of the heel in or incident to the clinching process.

Further purposes of this invention are to point out certain processes or methods of making the aforesaid built-up, re-enforced heels and also certain processes used in making turned heels and also to point out a process co-operatively combining both said processes in the making of built-up, re-enforced, turned heels.

A further purpose is to show certain mechanism especially adapted to the making of said heels and which may be used in practicing certain of said processes.

Further purposes and advantages of the invention will appear from the specification and claims herein.

Referring to the drawings in a more particular description, it will be seen that this invention contemplates a separate built-up heel formed of a plurality of lifts or layers of leather, leather substitute or other heel-forming material, said lifts consisting ultimately of the smallest and finishing and so-called top lift 16, a second lift 11 adjacent thereto, a plurality of other intermediate lifts or layers 12 of gradually increasing size, that is, of gradually greater width and length and finally a lowermost and usually still slightly larger lower or bottom lift 13.

Figure 3:
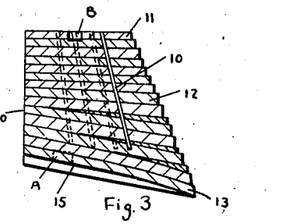
Fig. 3 is a vertical longitudinal sectional view on line 3—3 of Fig. 2 and showing more clearly the layer or lift construction of this built-up heel and also the diverging arrangement of the pricked holes 10 extending from the second or next to the top lift or layer 11 through most of the intermediate layers 12 and towards the largest and lower or bottom layer or lift 13.
Figures 4, 5, 6, 7, 8, 9, 26:
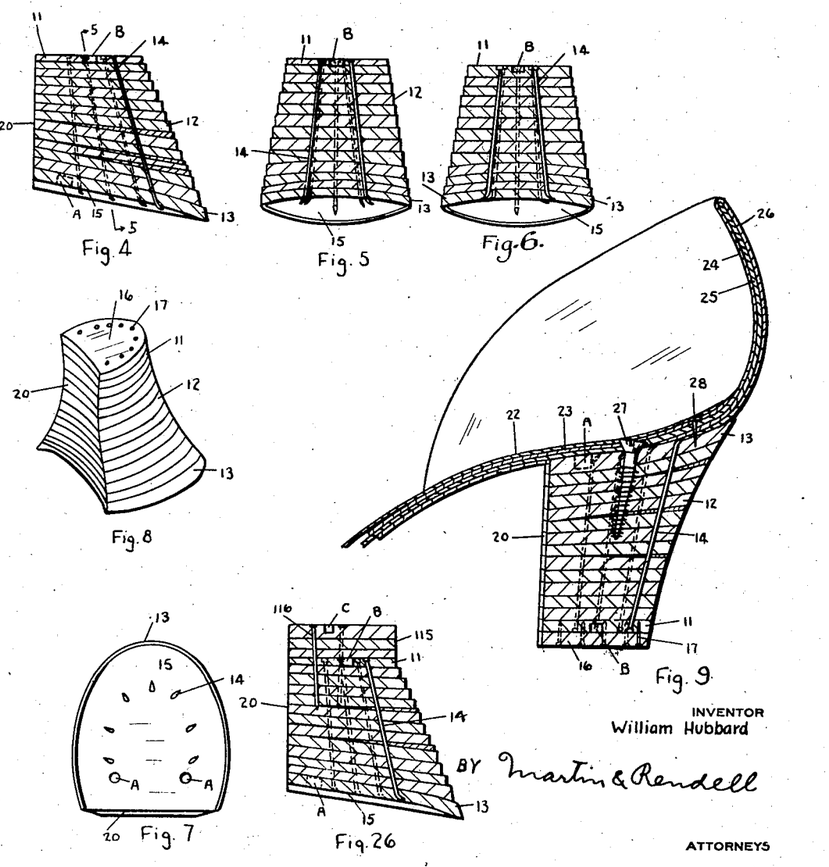
Fig. 4 is a sectional view similar to Fig. 3 after the nails 14 have been driven through the holes 10 and through the remaining lifts and even through the lower lift 13. This view also shows the preferred arrangement of having the projecting point ends of the said reinforcing nails 14 diverted somewhat as they come through the lower layer so as to at this stage of the manufacture point outwardly or radiate toward the adjacent sides and back of the heel.
Fig. 5 is a transverse sectional view on line 5—5 of Fig. 4 showing the diverging arrangement of the nails 14 as seen transversely of the heel.
Fig. 6 is a view similar to Fig. 5 after the projecting ends of the nails 14 have been completely turned outwardly and down into the outer face 15 of the lower or large layer or lift 13; that is, after the point ends of the nails have been clinched and imbedded in the material at the said outer face of the lower layer 13.
Fig. 7 is a plan view of the heel looking at the face 15 after the nails 14 have been clinched.
Fig. 8 is a perspective view of a heel formed of the said clinch-nailed lifts as shown in Figs. 6 and 7, but after the heel has been turned and shaped by a suitable turning operation and after the final or so-called top and finishing lift 16 has been placed upon the second lift 11 at the small end of the heel and permanently fastened thereto as by a plurality of small and relatively short nails 17.
Fig. 9 is a vertical longitudinal sectional view of a completed heel embodying this invention and of the rear portion of a slipper or shoe attached to said heel, said view being on a scale slightly larger than the other views.
Fig. 26 is a vertical sectional view of a regular clinch-nailed heel to which has been added a riser to increase the height of the heel.

All of these lifts except the final finishing lift 16 are first assembled in the proper order and secured together usually by layers of glue or other adhesive 18 placed between adjacent layers or lifts and with the whole mass strongly compressed together and usually more or less shaped so as to form at the larger or lower end of the heel a shallow cup or saucer-like depression 19 in the lower or large end of the heel with said depression, however, continued out to the front or breast 20 of the heel and preferably leaving an upstanding horseshoe-shaped heel seat 21 extending about the sides and rear of the heel. It will be understood furthermore that the different layers or lifts as shown particularly in Figs. 3 and 4 only approximate the ultimate size and shape of the heel and require utimately that the heel be subjected to a turning or trimming process so as to give to the built-up heel the required gentle, regular, smooth curves both for the sides and back of the heel and the smooth and either straight or curved face for the breast of the heel as appearing in Figs. 8 and 9 as distinct from the stepped appearance of these edges of the built-up heel as shown in Figs. 3, 4, and 5.

On account of the strain or breaking tension which comes upon the high heels of ladies' shoes and the occasional excessive or violent strain sometimes placed upon such high and relatively narrow heels, a glued built-up heel is not durable and is often broken or loosened so as to become unsightly and require repair which is an expensive and troublesome operation and usually means a re-placement by a new heel.

Various forms of re-inforcing these separate built-up heels have been tried such as various forms of dowel pins, but I believe I am first to provide a whole system of widely scattered or distributed re-inforcing nails severally extending through the layers of the heel from the said second lift or layer through the intermediate layers and into and preferably through and clinched over upon the outer or free surface 15 of the largest and lower layer or lift 13. In order to insure the proper location and arrangement of the re-inforcing nails 10 I make preformed holes 10 preferably by a pricking operation and extending from the outer surface of the said second lift 11 through the intermediate layers 12 and well towards but not necessarily to the said surface 15 at the outside of the largest or lower layer 13. From the general forward slanting construction of the heel as a whole as appears in Figs. 8 and 9 and from the inward tapering of the heel as it approaches the small top lift 16, it will be obvious that the greatest strain tending to disrupt the heel is placed upon the rear of the heel and at times against the sides of the heel. Accordingly I have used in the heel embodying this invention a plurality of re-inforcing nails 14 arranged generally in a horseshoe shape more or less as appears in Figs. 2 and 7; that is with the nails arranged in a curve following the sides and back of the heel where the strain is the greatest. The nails are arranged part way between the center of the heel and the outer surface so as to reinforce the heel as far out towards its outer surface as practicable and yet far enough in from all the outer surfaces of the heel as to avoid any distortion of the layers of the heel that would interfere with the smooth finish and sightly appearance of the finished heel. A further consideration in spacing these re-inforcing nails somewhat in from the sides and back of the heel is that the point ends of the nails preferably are and in practice are always clinched over at the lower surface 15 of the lower lift 13 and preferably in this clinching-over process the projected ends and points of the nails will be deflected outwardly towards the adjacent sides and rear of the heel as shown in Fig. 7. By deflecting these clinched ends outwardly the power of the clinched nails is distributed farther towards the outer edge of the said lower layer 13 and so makes the clinching action that much stronger towards the edge of said lower layer. Also the clinching of the point ends of the nails in this way follows the curve of the said saucer-like depression 19 occupying most of the surface 15 so that the angle formed by the clinched portion of the nails adjacent the unclinched portion is appreciably less than a right angle and so does not tend to break or weaken the holding action of said nails as would be the effect if the point ends of the nails were turned inwardly towards the center of the heel as that would result in an angle of less than ninety degrees.

While I have shown the arrangement of seven re-inforcing nails arranged in a horseshoe form, it will be understood that the precise number of these nails is not important, but rather that enough nails be used to reinforce the whole mass of the heel and securely hold it against any breaking or opening tension. It will be obvious that the arrangement or shape of the set of nails may differ from that shown and especially that the number of nails might be decreased in a smaller or lower heel or increased appreciably in a larger or higher heel without departing from the spirit of my invention.

It will be seen from Fig. 3 that the pre-formed holes 10 provided for the nails 14 are shown as extending about three-quarters or four-fifths of the way through the heel as then existing. I have found that this arrangement insures the passing of the nails 14 in the desired directions and in the located positions entirely through the heel without liability or practical possibility of any of the nails becoming bent in the mass of the heel or of having their points accidentally emerge through the sides, rear or breast of the heel.

It will be seen further from several views of the drawings that the holes 10 are arranged and the nails 14 finally driven through the heel in a diverging or slanting direction as the nails proceed from the said second lift 11 to and through the lower lift 13 and that such diverging or slanting arrangement of the nails is approximately in proportion to the gradual increasing size of the heel.

Figs. 4 and 5 show the heel at the stage of operations when the several nails 14 have been driven entirely through the various layers of the heel as then formed. Preferably as an incident to driving the nails through the lower layer 13 the points and the point ends of the nails projecting through said lower layer will be slightly deflected or diverted outwardly but preferably not at that same operation entirely clinched over and down into the body of the lower layer 13. Preferably a subsequent operation completes the turning over of these projected point ends of the nails and the clinching thereof into the body of the lower layer 13. The object and advantage of letting the projecting ends pass clear through the free surface 15 of the lower lift 13 and only slightly diverting the projecting points is to overcome any possibility of the body of the nails becoming distorted as would be the case were the points driven straight against a hard metal surface so that the clinching operation would begin as soon as the points began to emerge from the free surface 15 of the lower layer 13. As appears in Figs. 4 and 5 the projected points are bent over only part way and the means used to accomplish this does not interfere with the free driving of the nails all the way through the heel. Furthermore, the allowing of the points to project clear through the lower layer 13 and then be clinched as a separate operation allows better control of the clinching operation and insures that all of the projected points and adjacent parts of the nails will extend outwardly in a radiating direction as shown in Fig. 7.

Figs. 6 and 7 show two views of the heel after the clinching operation has been completed.

After the nails 14 have been inserted in the heels and the clinching operation completed by turning the point ends outwardly and downwardly and into the body of the lower layer 13 the heels are subjected to a cutting or turning operation so as to trim the opposite sides and the back of the heels to the desired taper and curve and smooth surface and similarly the breast of the heel is subjected to a cutting and trimming operation to give the proper shape, contour and smooth surface to the breast of the heel. Then the top or finishing lift 16 of the proper shape and size to fit the adjacent second lift 11 is placed on the heel against said lift 11 and securely and permanently fastened to the heel as by a row of relatively small and short nails or brads 17 which may be relatively close to the outer edge of the said top lift 16 so as to hold the outer edges securely to the rest of the heel and incidentally so as to have the said small nails 17 pass outside of the heads of the reinforcing nails 14. The mechanical complete separate heel is then submitted to any necessary final polishing and smoothing operation and is then painted, stained or otherwise colored and polished.

The heel is then complete as a separate built-up turned heel at which stage it is supplied usually to another manufacturer to be affixed to the body of a shoe or slipper. Fig. 9 shows a convenient and proper form of so fastening the heel of my invention to the heel portion of a shoe or slipper. In this view it will be seen that a flat-headed screw 27 of proper size, length and form is inserted downwardly through the sole and adjacent parts of the heel section of the shoe and through the large bottom layer 13 and several adjacent layers of the intermediate layers 12. This screw is of sufficient size and length to stand the main strain of holding the separate heel against the heel portion of the shoe or slipper. But the connection between the shoe or slipper and the heel is further reinforced and kept from rotation by the addition of several nails projecting down through the successive parts of the shoe or slipper adjacent the heel such as the insole 22, the shank 23, the inner quarter 24, the counter 25 and the outer quarter 26. It will be understood that these same parts except perhaps the two quarters or even the counter will be pierced by the main holding screw 27.

I will now describe the preferred method or process of making this clinch-nailed reinforced built-up heel and a convenient and the preferred form of mechanism for utilizing said process and producing the said reinforced heel.

I will also describe the steps of the process of preparing for and performing the turning operation upon the heel. It will be seen that certain of the preparatory or handling steps of these two processes are common to each process and that in fact these preparatory or handling steps form one or more steps that are utilized in both the reenforcing process and the turning process and so there is pointed out one extended process that covers both the reenforcing of the heel and the turning of the heel. For clarity and briefness I will describe all the steps of either or both processes in their chronological order and the mechanism used therefor.

*Operation of compressing heel and forming double guide recesses in bottom lift*

Figures 10, 13, 14, 17:
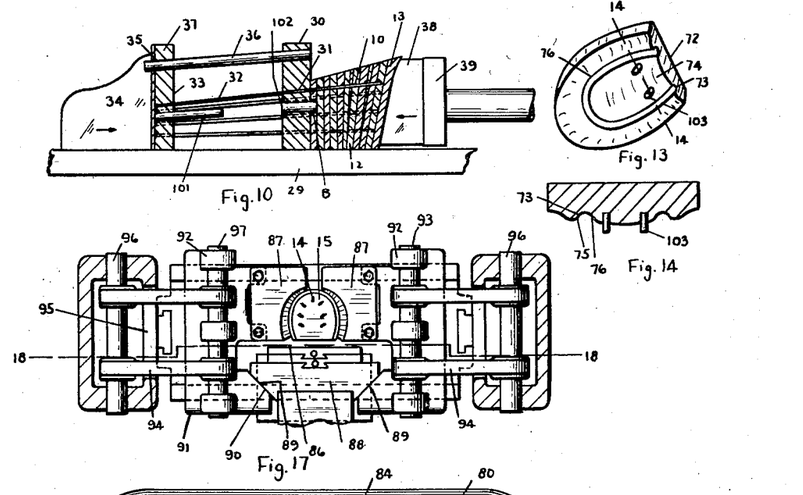
Fig. 10 is a view partly in side elevation and partly in longitudinal vertical section and somewhat diagrammatic of the mechanism used to form the series of holes in the heel for the clinching nails pursuant to one step of my process and to form the single guide recess in the then top lift 11.
Figs. 13 and 14 are respectively a perspective and a transverse sectional view of the deflecting anvil 72 shown in Figs. 11 and 12.
Fig. 17 is a horizontal sectional view on line 17—17 of Fig. 18
Figures 15, 16, 18, 20, 21:
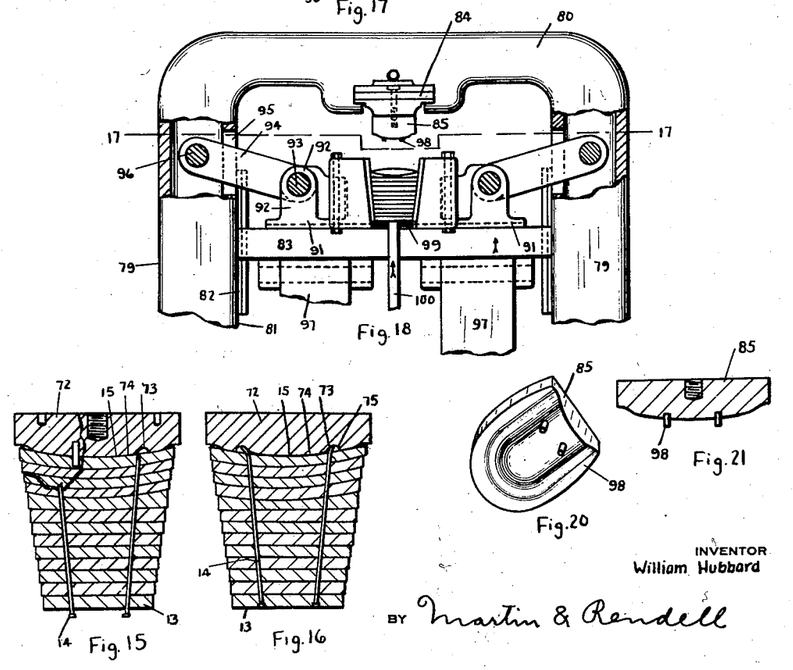
Figs. 15 and 16 are detail sectional views respectively of said deflector and a heel before and after the deflecting operation or step of my process.
Fig. 18 is a view partly in front elevation and partly in vertical sectional view on line 18—18 of Fig. 17 of a heel compressing machine adapted with one anvil to compress the heel and from the two guide recesses in the bottom lift at the first stage of manufacture and at a later stage and with another anvil to finally clinch the projecting points of the nails into the bottom lift and at the same time to further compress the heel.
Figs. 20 and 21 are respectively a perspective view and a transverse sectional view of the anvil 104 used in the final clinching operation.

Fig. 17 is a horizontal sectional view on line 17—17 of Fig. 18 and Fig. 18 is a view partly in front elevation and partly in vertical section on line 18—18 of Fig. 17 of a conventional heel-compressing machine which is modified to at the same time form the two guide and holding recesses A, A in the exterior face of the bottom lift. From a suitable base or pedestal (not shown) there extends upward a U-shaped frame consisting of two side posts 79 joined by a top 80. On the inner sides 81 of the two side posts 79 are provided upright guideways 82 whereby a cross head 83 is reciprocatingly mounted between the two side posts so as to have an up and down movement in a right line, such movement being imparted in any desired or conventional way as by plates 97 forming part of a toggle joint, the rest of which operating mechanism is not shown and is not necessary to the understanding of this part of the machine.

Preferably at the center of the top 80 and in its downwardly facing side there is adjustably mounted an anvil holder 84 carrying a removable anvil 85. Means are provided for adjusting the anvil holder 84 back and forth as desired for any particular operation. The anvil 85 has its lower face rounded downwardly in convex form to fit accurately the outer face 15 of the large bottom layer or lift 13 of the heel and is provided with two downwardly facing pins 98 adapted to press the two guide recesses A, A in the exterior face of the bottom lift 13. These anvil members are made removable so that another anvil of different form may be readily placed in the machine to adapt the machine for use in compressing and recessing other sizes or types of heels.

Upon the cross head 83 is a multiple-part heel-supporting die having its parts automatically moved apart at the end of one compressing operation so as to be in position to readily remove the compressed heel and to have another heel readily placed therein. The early part of the travel of the cross head 83 brings the several parts of this die towards each other and closely embracing and supporting the side, back and breast of the heel and continuing so to do while the heel therein is moved upward against the anvil 85. As shown in Fig. 17 the parts of the multiple-piece heel-holding die consists of a breast plate 86 adapted to engage the breast of the heel and two similar half-horseshoe shaped blocks 87—87 oppositely located and adapted to come together with each block supporting one side of the heel and a half of the back of the heel upon their respective curved inner faces. The breast plate 86 is in turn adjustably fastened to the rearward side of a member 88 having a back and forth sliding action upon the cross head 83 and provided with oppositely disposed cam faces 89—89, each adapted to be engaged by similar slanting cam faces 90 upon the forward inner half of an irregular shaped platen 91. One of these platens is provided on each side of the machine between the heel-engaging die and the frame post 79. Suitable lands and guideways are provided respectively upon the platen and the cross head 83 for a limited sliding movement of each platen from its adjacent frame post 79 towards the center of the machine or towards its adjacent side of the heel-supporting die. A convenient and the preferred means employed for producing this inward movement of each platen upon the main upward movement of the cross head 83 is to provide a plurality of upstanding ears 92. The ears on each platen are provided with aligned bores in which is mounted a short shaft 93 upon which is mounted a pair of arms 94 projecting from the ears through a suitable slot 95 in the hollow post 79 to a similar rod or shaft 96 having its ends mounted in the back and front walls of post 79.

It will now be seen that the first part of the upward motion of the cross head 83 will move the irregular shaped platens 91 towards each other, thereby carrying the two half-horseshoe blocks 87—87 towards each other and against the heel that has been placed in the machine to be compressed. At the same time this movement of the platens towards each other of course moves the cams 90 on the platens towards each other and into camming operation with the opposite cam faces 89 on the member 88 and so moves the breast plate 86 back against the breast of the heel. As the heel is thus surrounded by blocks 87—87 and breast plate 86 the further upward movement of the cross head 83 with great power carries the heel bodily upward and brings its large lift 13 commonly called the lower lift into immediate contact with the fixed anvil 85 and so compresses the heel and at the same time the two accurately placed die pins in the anvil 85 press or punch the two guiding and holding recesses A, A into the exterior face of the said lift 13. It will be understood of course that during this pressing process the smaller end of the heel is securely supported by a bottom rest 99 which is in fixed and determined position relative to the cross head 83 and largely determines the extent of pressure and the ultimate height of the heel when this pressing operation is completed. After this compressing operation is completed downward movement of the cross head 83 retracts the blocks 87 and causes or allows the breastplate 86 to be drawn forward. Conveniently then the bottom rest 99 is temporarily projected upward a short distance carrying the heel therewith so as to more readily allow the operator to pick the heel out from between the side blocks and breast plate. This upward movement of the bottom rest 99 may be conveniently caused by a movement upward at the proper time of the rest-carrying rod 100 actuated by means connected to its lower end and not necessary to be described herein. It will be understood that the heel-compressing operation is old and well known and already commonly used in making built-up heels, but by modifying the heel compressor to have its anvil 85 equipped with the pins 98 I form the double guide recesses A, A in the bottom lift 13 without additional machinery and without any additional operations or additional handling of the heels. These double guide and holding recesses A, A in the bottom lift 13 of the heel are used in both the process of re-enforcing the heel and in the process of turning the heel as will appear hereinafter.

*Nail-hole forming or pricking operation and single-guide recess forming operation and mechanism therefor*

Figure 1:
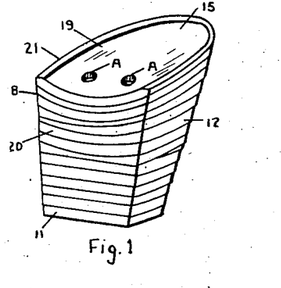
Fig. 1 is a perspective view of a heel with its plurality of sections assembled and glued together and usually compressed and in the stage of manufacture to which this invention relates and so usually without the finishing so-called top lift or layer but showing the bottom lift provided with the two guide recesses provided for carrying out my processes.
Figure 2:
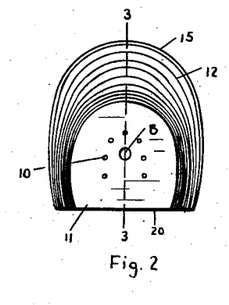
Fig. 2 is a plan view looking at the top or small end of the heel shown in Fig. 1 and showing the plurality of pricked holes 10 and the single guide recess in the then top lift.

The next operation includes in practice the simultaneous performance of a step in each process which step is not used in the other process. The one machine used forms conveniently by pricking the single guide recess B and the plurality of holes 10 extending into the heel as shown in Figs. 2 and 3 from the outer surface of the second layer 11 at the small end of the heel and extending through most of the intermediate layers 12 towards the lower or bottom and larger layer 13. As already mentioned these holes are arranged conveniently in the form of a horseshoe with the ends extending towards the breast of the heel and with the several holes arranged part way between the side and back edges of the heel and the center of the heel. The advantage and purpose of pre-forming these holes is to aid in the driving of the nails without the use of excessive power and incidentally to allow of all the nails being driven at one time by suitable mechanism therefor and furthermore to insure that the nails will extend in the proper direction and keep in the desired location through the entire depth of the heel. On account of the density to which the leather or other heel-making layers are reduced, the driving of nails through the heel without the provision of holes therefor would result in many of the nails going astray and would result in many of them coming out through the side of the heel and so spoiling a heel. Furthermore, even though a nail did not come entirely through a side or back surface or the breast of the heel, a nail that approached too close to those surfaces would place an undue strain upon the leather or other material forming the heel which would be liable to cause a bulge or rough spot and perhaps ultimately a pushing out of the leather where a nail had been allowed to go too close to an exterior surface of the heel.

Furthermore, as practically all heels to which the application of any part of this invention is made are relatively high and at least towards the ground-engaging end much smaller and often very small and slender, it is necessary as already mentioned in the description of the heel per se that the reinforcing nails slant away from each other or diverge as they proceed from the small end or second layer 11 towards the lower or bottom layer or larger end of the heel. Furthermore, as is indicated in Fig. 3, 4, and 9 the nails as a whole slant toward the rear of the heel as they approach the said lower or shoe-engaging layer 13.

A proper and convenient mechanism or machine for simultaneously performing these two steps of the processes by machinery is indicated in Fig. 10. This is a view somewhat diagrammatic, partly in side elevation but mostly in central longitudinal section of a machine for at one operation pricking all of the holes 10 into a heel and forming the single guide recess B. In this device the relatively fixed bed plate 29 is shown as arranged horizontally and, upstanding therefrom and secured thereto, is a die 30 which has a series of holes 31 arranged in the form and spaced apart so as to guide the several prickers 32 forward or to the right into the heel as the parts are shown in said drawing to make the holes 10 in the heel. The prickers 32 have their base ends located and held in the holder 33 which is mounted to slide in a somewhat slanting direction upwardly as the said holder is carried forward by the movement to the right of the block 34. It will be seen that the holes 31 in the die 30 are arranged in a slanting direction and as a whole somewhat closer together than the holes 10 in the heel. In other words, the holes 31 are so arranged that as the prickers 32 are forced forwardly or to the right therethrough, said prickers slant away from each other or diverge away from each other and generally slightly also towards the rear of the heel as already mentioned for the desired location of said holes. It will be seen, therefore, that the series of prickers 32 slant towards each other and particularly as a whole slant downwardly towards the bed plate 29 as the said prickers extend towards their holder 33. Consequently as the prickers are advanced by the forward motion of the holder 33 the said holder should slightly rise to compensate for the general upward movement of the rear ends of the prickers. This slight movement is accomplished by the said holder having two or more holes 35 fitting two or more similarly located and shaped guide rods 36 rigidly projecting to the left from the die 30. The pricker holder 33 is allowed this upward movement when going forward and a consequent downward movement when going back without becoming disengaged from the block 34 by reason of lateral lands 37 on the opposite sides of the holder 34 projecting into corresponding guideways in the forward corners of the block 34. In practice the point or right hand ends of the prickers remain in their respective holes 31 of the die 30 even at the retracted position of the prickers. Before the forward motion of the prickers is commenced a heel is placed in the proper position in front or to the right of the die 30 and accurately and properly located in the desired position relative to the die and to the bed plate 29 by proper gages. Then a heel block 38 of proper size and conformation to fit the lower end of the heel is moved up against the lower end of the heel so as to hold the same rigidly in place during the pricking operation. Conveniently the heel block 38 will be detachably secured to the pusher 39 which is one of the movable and regular parts of the machine as distinct from the heel holder 38 which is removable and may be replaced by any one of many other forms according to the size and conformation of the heel being operated upon at any given time. Assuming that the proper heel block 38 is in place and has been moved up against the heel, the next movement of the mechanism is that of having the block 34 moved forward or to the right by convenient means (not shown). This forward motion of the block carries the prickers 32 forward to the right and in the proper direction into the heel and pricks or forms the said holes 10. The pricker holder 33 also carries a larger punch 101 adapted in the latter part of the travel to enter and pass through the funnel hole 102 in die 30 and form the guide recess B in the small end of the heel. I have shown the holes 10 as extending only about three-quarters or four-fifths of the way through the heel. This extent of the hole is sufficient to properly guide the nails and determine their proper location and the termination of the holes without the prickers extending clear through the whole heel tends to simplify the mechanism for pricking and the incidental parts of the machine and the efficiency and regularity of the pricking operation. Immediately after the prickers have advanced the desired distance, the block 34 is withdrawn to the left drawing the prickers 32 from the holes 10 and punch 101 from recess B. Immediately thereafter the pusher 39 and its attached heel block 38 are withdrawn to the right by convenient mechanism (not shown). The heel with the holes 10 and recess B formed therein is then withdrawn from this apparatus and a fresh heel inserted in place and the different steps of this part of each process are again repeated with the same result.

The prickers 32 are essentially small slender punches being at their operating ends provided with sharply squared edges which do the cutting part of the work.

*Nailing process and nailing machine*

The next step in the process of forming my improved heel is to drive a set of nails into the preformed holes 10 of said heel and clear through the heel as it then exists but without subjecting the nails to the resistance or strain of turning the point ends thereof directly over or in other words clinching the point ends of the nail into the outer surface of the lower large layer 13. In other words, this step of the process drives the nails 14 into the small end of the heel and thereafter through the remaining heel until the heads of the nails are imbedded in the said second lift 11 and the points and the point ends of the nails project through and beyond the outer surface 15 of the lower layer 12. In this respect my process differs from the usual and ordinary clinching operation where a nail is driven through the ordinary wood or other material and as soon as its point begins to emerge on the farther side of the wood the point of the nail engages a metallic hard anvil member and the last part of the driving of the nail cotemporaneously drives the forward or point end of the nail continuously against the anvil and so turns the point end of the nail over and back into the adjacent surface of the wood. In my process it is essential that the nails be driven clear through the further or lower side of the heel without subjecting the nails to the added resistance of being at that time clinched and so without subjecting the relatively small area of adjacent leather to a tearing or distorting action that would otherwise occur. I have found, however, that it is within the range of practicability to combine with the nailing operation as I carry it out a slight deflection of the points of the nails as they emerge from the surface 15 of the lower ledge 13. This deflection, however, is so slight that it does not materially add to the resistance of driving the nails and especially does not tend to distort or dislocate the nails sufficiently to tear or distort the leather surrounding the point ends of the nails. The extent of deflection is relatively slight, say on the whole from fifteen to twenty-five degrees, but a large part of this is simply through the more slender parts of the nails being turned outwardly while the following stiffer or larger parts of the points and the full sized parts of the nails are turned outward much less. The extent and arrangement of this deflection is well shown in Figs. 4 and 5 of the drawings and the mechanism of procuring such slight deflection without interfering with the driving of the nails clear through the heel will be described hereafter.

Figs. 11 to 16 illustrate the steps of this part of my process invention and the preferred machinery or mechanism for performing said steps.

Figure 11:
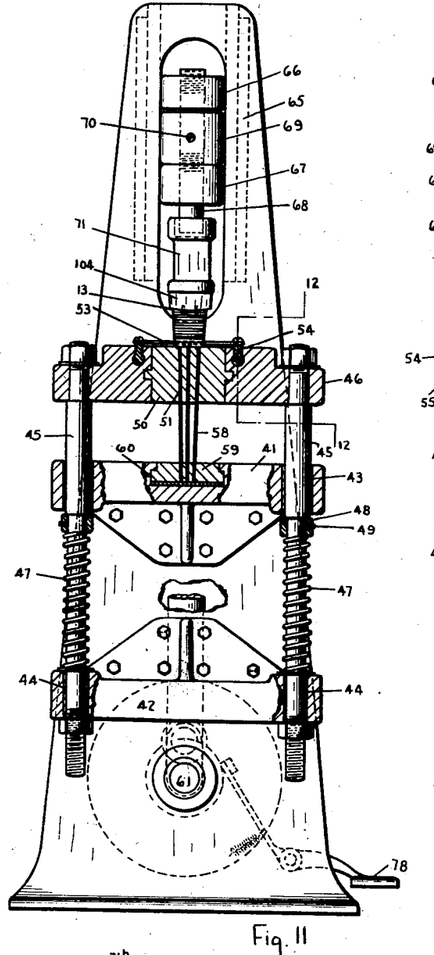
Fig. 11 is a view partly in front elevation and partly in vertical section of a machine for driving the series of clinchable nails into a heel and for slightly deflecting the projecting point ends of the nails and illustrating the intermediate steps of one branch of my process.
Figure 12:
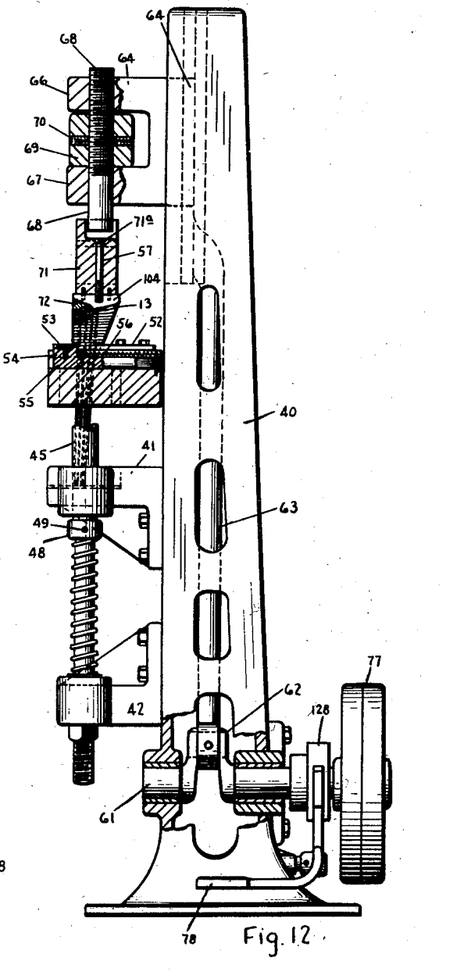
Fig. 12 is a view partly in side elevation and partly in vertical section of the machine shown in Fig. 11.

Figs. 11 and 12 are respectively front and side elevations of a nailing machine especially adapted to perform this nailing operation, considerable parts of the machine in both views, however, being shown in vertical section.

Upon the front of a strong upstanding frame 40 are provided and rigidly secured upper and lower strong brackets 41 and 42 respectively, each having right and left hand vertically arranged bearings 43 in the upper bracket and 44 in the lower bracket. Slidingly mounted in these two sets of bearings are located a pair of rods 45 connected at their upper ends by a bridge 46. Said bridge is normally but yieldingly held in raised position as shown in Figs. 11 and 12 by means of the pair of springs 47 coiled about the intermediate part of said rods 45 between the upper and lower bearings 43 and 44 with the lower ends of said springs bearing against the lower bracket 42 and with the upper ends of said springs bearing against the lower side of collars 48 mounted upon said rod 45 and adjustably fixed in position relative to said rod by means of set screws 49 in the collars engaging the enclosed rod. Removably mounted in the said vertically moving bridge 46 is a nail-holder 50 having a series of upright holes 51 in which are placed point end upwards the nails 14. It will be understood of course that in the use of the machine a nail holder 50 will be provided having the upwardly standing nail holes 51 so arranged and so spaced and of such number as to correspond accurately with the holes 10 already provided in the heel which is now to be placed in this machine as shown in Figs. 11 and 12 with the second or small lift 11 facing downward and resting flat upon the upper surface of the nail holder 50. As the holes in said heel slant outwardly as they go upwardly towards the larger lift 13 as the heel is shown arranged in this machine, it will be understood of course that the nail holes 51 at the upper end of the holder 50 are in alignment with the holes in the said second lift 11 and with the nail holes 51 converging as they extend downwardly in the nail holder.

In order to assist in placing and holding the small end of the heel in proper position on the top of the nail holder 50 there is provided upon the rear part of the top of said bridge 46 an adjustably located guide plate 52 having a V or angular shaped front to center the rear of the heel. This plate is preferably adjustably secured to the bridge 46 so as to accommodate it to heels of different sizes. In order to complete the proper location and ultimate holding of the heel during this nailing operation, there is provided at the front of the bridge a spring-tensioned horizontally located bar 53. The opposite ends of this bar extend beyond the removable nail holder so as to engage and be fastened to the upper part of a boss 54 formed with and projecting from the upper part of the forward end of a plunger 55 horizontally mounted in the bridge 46. The hole carrying each plunger 55 and its boss projects rearwardly into the bridge as is particularly shown in this part of Fig. 12 which is a sectional view upon line 12—12 of Fig. 11. To the rear of the box 54 the plunger 55 has secured thereto the forward end of a contractile spring 56 the rear end of which is attached to a fixed part of the bridge 4. It will be seen that these two spring-tensioned mechanisms tend to yieldingly move the bar 53 to the rear and so hold the lower end of the heel in place upon the top of the nail holder 50. The tension against this holding bar is light enough to allow it to be readily brought forward for the placing of the heel immediately to the rear thereof, but is strong enough to hold the heel during the nailing process as the nailing process produced no strain tending to move the heel forward.

Prior to the placing of a heel in position as shown in Figs. 11 and 12, a set of the proper lengthened nails 14 are placed in the holes 51 of the nail holder 50. The bottom ends of these nail holes are closed by the upper end of the push rods 58 severally extending down from the respective holes into a rod holder 59 suitably mounted in the upper bracket 41 immediately below the nail holder 50. The push rod holder 59 is provided with laterally extending lands 60 mounted in guideways extending horizontally back and forth in the intermediate part of the said upper bracket 41 so as to allow for a slight back and forth horizontal movement of the said push rod holder 59 and the push rods 58 as a group incident to the slanting direction of the generally upright holes 51 in the nail holder 50.

Upon the power-driven shaft 61 suitably journaled in the bottom of the frame 40 is provided a crank arm 62 from which extends upwardly a long connecting rod 63 adapted at its upper end to engage with a suitable slight pivoting action the rear side of a vertically-moving sliding block 64. Most of this block is mounted in front of the frame 40 and is held to slide thereon by its edges being guided between the opposite slideways 65. From the front of the block project upper and lower strong brackets 66 and 67. These brackets are centrally bored so as to carry therein the vertically arranged rod 68 substantially in line with the position occupied by the heel upon the nail holder 50 on the bridge 46. The rod 68 has a limited endwise sliding adjustment relative to said bracket 66 and 67 which is determined by the setting of nut 69 threaded upon said rod and locked thereto by suitable means as by set screws 70. The opposite ends of the nut engage the upper surface of the lower bracket 67 and the lower surface of the upper bracket 66 and so cause the rod to move up and down with the block 64 without loose motion relative to the brackets 66 and 67.

As already intimated the heel is placed upon the bridge 46 of the nailing machine as shown in Figs. 11 and 12 with the small or top end of the heel against said bridge and with the larger end of the heel having the lift 13 towards the top and a little ways below the lower end of the rod 68 of the moving block 64. I provide an anvil 72 having its lower face generally convex so as to accurately fit the exterior face of the lift 13 at the large and now upper end of the heel. In this lower face of the anvil there are accurately placed and fixed two downwardly projecting pins 103. These pins correspond in location to the pins 98 already mentioned as being in the lower face of the forming anvil 85 of the heel-compressing machine and accordingly the pins 103 in the anvil 72 are adapted to fit into the double guiding and holding recesses A, A formed in the bottom layer 13 of the heel during the compressing process and remaining in the heel for the express purpose of actively guiding and holding the anvil 72 in the proper position upon the upper end of the heel, that is the layer 13 as shown more particularly in Fig. 12.

Figure 19:
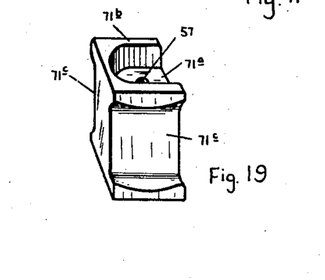
Fig. 19 is a perspective view of the anvil holder 71.

Preferably for accuracy and easy operation the anvil 72 is not rigidly secured to or permanently connected to the moving rod 68, but has its upper side secured to the lower end of anvil holder 71, a general perspective view of which holder is shown in Fig. 19. The anvil 72 is detachably secured to the anvil holder 71 by a screw 57 passing vertically downward through holder 71 and having its lower screw-threaded end engage a screw-threaded hole in the upper face of the anvil 72. The connected parts are kept from rotation in any convenient way as by dowel pins 104 secured to the lower end of the anvil holder and projecting into appropriate dowels in the upper face of the anvil. In this way different sizes and shapes of anvil may be readily attached to the anvil holder. The anvil holder with the anvil at its lower end is adapted to be manually placed by the operator in position in the machine so as to have the lower face of the anvil closely engaging the now upper end of the heel with the guiding pins 102 of the anvil placed in the double guide recesses A. As so placed in the machine the main upper end 71ª of the anvil holder is a slight distance down from the lower end of the vertically moving rod 68. At the two sides and at the front of the holder as placed in the machine the anvil holder rises above the main top face 71ª in the form of a flange 71ᵇ as shown particularly in Fig. 19. This flange helps in the ready location of the anvil and holder in the machine and on top of the heel and practically sets the proper position of the holder by the operator pushing the front part of the flange substantially back to the depending lower end of the rod 68. Conveniently the opposite sides of the anvil holder 71 are recessed as at 71ᶜ to aid in the easy and positive grasping of the said holder in the hand of the operator.

It will now be seen that the first part of the downward motion of the sliding block 64 will bring the bottom end of the rod 68 against the main top face 71ª of the anvil holder and that upon further continued downward movement of the sliding block 64 the anvil 72 bearing upon the heel will force the bridge 46 and the nail holder 50 downwardly. This downward movement of the bridge 46 and the nail holder and the heel and the parts above the heel will in an obvious manner cause the push rods 58 to push the nails 14 upwardly through the nail holes 51 and into the holes 10 of the heel. During the latter part of this motion the nails will be forced through the imperforated layer or layers if any of the heel adjacent the lower or large layer 13 of the heel and thereafter the point and the adjacent point ends of the nails 14 will be pushed clear through the outer surface of said lift 13.

Fig. 15 is a detail sectional view on an enlarged scale showing the relative position of the point ends of the heel nails and the deflecting groove 73 in the downward facing dome-shaped lower face 74 of the anvil member 72 just before the nails are pushed through the face 15 of the heels. Fig. 13 is a perspective view of the anvil member 72 as seen from below and Fig. 14 is a transverse vertical sectional view thereof on line 14—14 of Fig. 13. It will be understood that the general lower face 74 of the anvil 72 is made rounding downwardly to fit closely the saucer-like curved face of the shoe-engaging outer face 15 of the heel. In this face 74, however, there is cut or otherwise formed the horseshoe-shaped deflecting groove or recess 73. This is placed and proportioned to receive the outcoming points of the heel nails as they emerge from the face 15 of the heel. The cross-sectional shape of any part of this deflecting recess, however, plainly shown in Figs. 13 to 16 is roughly the longitudinal half of an oval or heart-shaped figure with the steeper side 75 of the recess 73 towards the sides or back of the heel and with the less sharply curved or slanting other side 76 away from the sides and rear of the heel. The preferred relative arrangement of this deflecting recess and the outcoming point of the nails is seen in Fig. 15 in that the point of the nail is allowed to come through relatively close to the more slanting side 76 so as to almost come through its full projecting length before the extreme point of the nail strikes the middle or the beginning of the more sharply curved half 75 of the recess 73. In the detail sectional view, Fig. 16, is shown approximately the preferred arrangement of the parts at the completion of this nail-driving and incidental deflecting operation. It will be seen from this view that the points of the nails have engaged some part of the more slanting side 76 and have had their points and some of the adjacent part of the nail deflected outwardly an appreciable amount. Usually the angle of the inclination taken as a whole is appreciably less than forty-five degrees but enough deflection has been given especially to the outer or extreme point end of the nail so as to allow the next successive process of fully clinching the heads of the nails to be accomplished at one step.

It will be understood of course that the anvil member 72 is removable and replaceable as needed by other anvil members suited to the size and shape of the shoe heel and particularly to the arrangement and size of the horseshoe-shaped line of nail points as they will be driven through the heel of any particular size and kind.

On the backward movement of the sliding block 64 the two springs 47 which were compressed upon the downward or working stroke of said block force the rods 45 and therewith the bridge 46 and its nailholder 50 upward to the limit of upward motion of said bridge thereby withdrawing the push rods 58 from their upper position immediately against the imbedded head ends of the nails to their lowermost positions, that is, as shown in Fig. 11 with the upper ends of the push rods just within the lower part of the nailholder 50. Further upward movement of the sliding block 64 lifts the bottom end of rod 68 from the anvil member 72 to the position shown in Figs. 11 and 12; that is cleared sufficiently to allow of the removal of the anvil holder and its anvil 72 and then of the nailed heel. At that stage of movement of the machine the one-operation clutch 128 automatically disconnects the shaft 61 from its power-driven wheel 77 and prevents further movement of the sliding block 64 and correspondingly any other part of the machine until the operator affirmatively moves the pedal 78 again. This of course is not done until the old heel has been removed, a new set of nails has been placed in the nailholder and a new heel and the anvil-holder 71 with its anvil 72 placed in the machine. Then pressure upon the pedal 78 makes the machine complete one full operation as already described in detail and again brings the machine to a stop. The presence of the guide pins 103 of anvil 72 in the guide recesses A, A prevents any nail from entering said recesses and so ensures that these recesses will be clear when needed for the turning operation.

*Clinching operation and mechanism therefor*

The nailed heel, preferably with the extreme points of the nails slightly deflected as hereinbefore mentioned, is then subjected to the clinching operation proper which is preferably and conveniently carried in a heel compressing machine such as already described and shown in Figs. 17 and 18 but equipped with an anvil 104 especially adapted to perform the said clinching operation regularly, effectively and without damage to the heel. Furthermore, preferably at this step and by the mechanism herein described, the heel is subjected to a further final decided compressing action so as to make the heel that much stronger and denser. By reason of this final compression of the heel being done at the time when the heel nails are being clinched, the said compression is retained in the heel because the effective length of the nails is shortened proportionately and the clinching operation carried on longer than for a plain clinching operation and so makes the clinched end of the nails hold all of the compression which the machine has effected upon the leather or the material of the heel. The anvil 104 used for this final clinching operation is shown in perspective view in Fig. 20 and in transverse section in Fig. 21. This anvil is placed in a heel-compressing machine such as shown herein in Figs. 17 and 18 in place of the anvil 85 shown in those views. For operation upon the same line of heels the machine will be adjusted for further compressing the heels at the time of this final clinching by raising the bottom rest 99 that supports the small end of the heel in the machine. This raising of the bottom rest is only a small fraction of an inch, say one-sixteenth of an inch and is conveniently accomplished by inserting an annular flat filler ring beneath the rest 99 and about its operating rod 100. It is to be noted that the convex lower or working face of the anvil 104 is rounded downwardly to fit the shape of the large end of the heel and in an obvious manner will cause the projecting point ends of the nails to be clinched over into the body of the heel at its larger end as appears in Fig. 6 as compared with Figs. 5 and 17.

Furthermore, it will be noted that this final clinching operation is carried on without allowing any part of the clinched nails to enter the two guiding and holding recesses A, A. The nails nearest these recesses as will be seen best from Fig. 7 are located a safe distance away from the recesses and the deflection of the projecting points of the nails nearest said recesses is made in a direction away from the said recesses so that the final clinching by the anvil 104 insures the bending of the points of nails nearest these recesses outwardly toward the adjacent edges of the sides of the large end of the heel rather than towards the recesses.

*Turning operation and mechanism therefor*

Figures 22, 23, 24, 25, 27, 28:
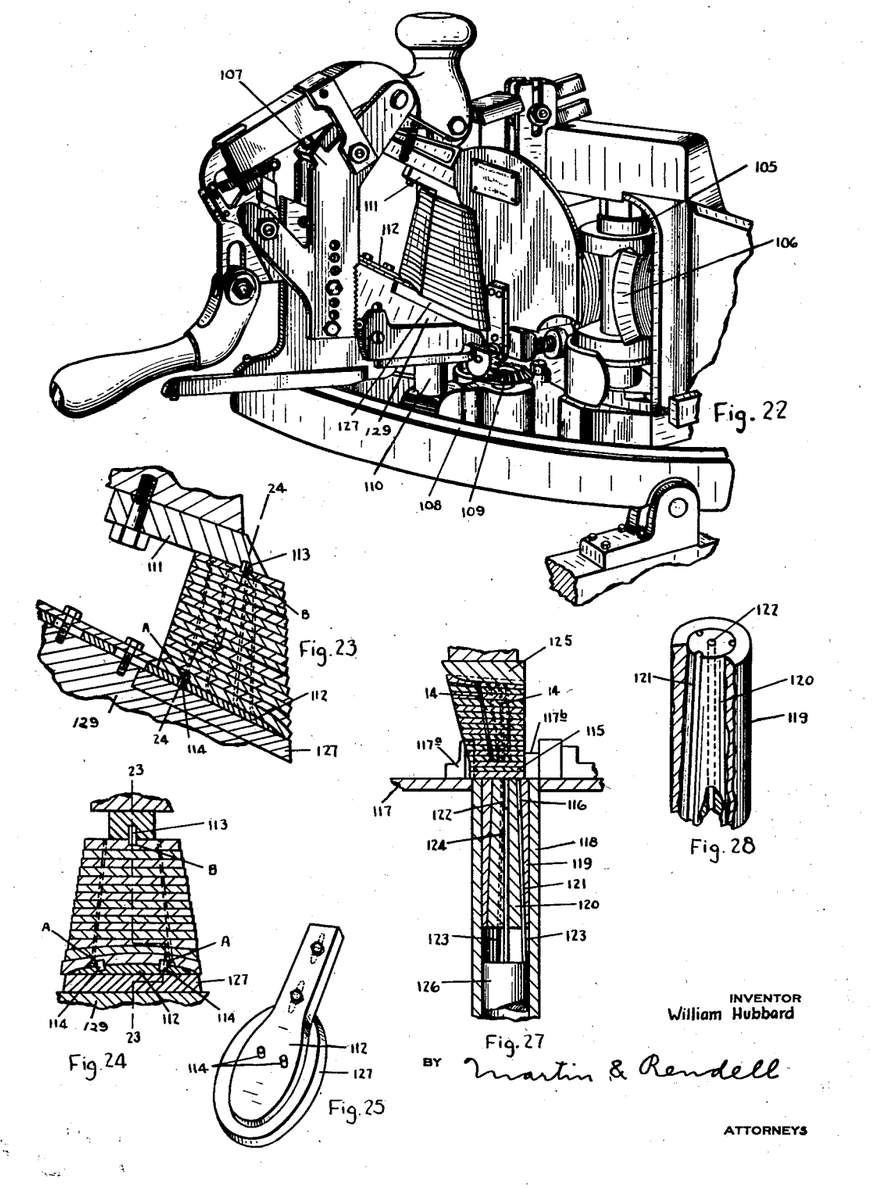
Fig. 22 is a perspective view of a heel-turning machine equipped with mechanism illustrating one step in the process of making the heels mentioned.
Fig. 23 is a vertical sectional view on line 23—23 of Fig. 24 through the upper and lower jack holders of the jack of the machine of Fig. 22 and through a heel embodying this invention.
Fig. 24 is a transverse sectional view on line 24—24 of Fig. 23.
Fig. 25 is a perspective view of the lower holding plate of the jack shown in Figs. 22 to 24.
Fig. 27 is a vertical sectional view through the machine for adding such a riser to the heel and Fig. 28 is a detail perspective view of a part of said machine.

Fig. 22 is a perspective view of a heel-turning machine wherein two oppositely placed cutters having a vertical axis and suitably rotated by power are provided. In this view the right hand cutter 105 is visible with its shaped knives 106 adapted to trim a half of the back and one side of the heel when the heel-holding jack generally denoted by the numeral 107 is swung to the right by the jack holder 108 swinging on pivot 109 and later by the jack per se being partly rotated relative to the jack holder 108 by partial rotation of the jack upon pivot 110. A similar movement of the jack and jack holder 108 to the left and then a partial rotation of the jack upon its holder brings the heel into engagement with the cutter on that side and turns the other half of the back of the heel and the other side of the heel.

Heretofore the built-up heel when placed in the jack of this turning machine has been located between the upper jack plate 111 and the lower jack plate 112 only by sight or touch of the operator seeing or feeling whether the adjacent parts of the two ends of the heel are about in proper position relative to the said plates 111 and 112. As already explained, in these built-up heels the different lifts are only approximately the proper size and all have to be trimmed down. Furthermore, it often happens that either the top or bottom lift of the heel may be out of place considerably relative to the general shape of the heel. Consequently an operator placing the heel in the jack would often be misled into getting the heel not in a proper position in the jack for turning the heel to true shape. Furthermore, on account of the placing of the heel being only by sight and touch there was great chance for variation in placing the different heels in the jack of the turning machine with consequent incorrect turning of the heel.

Heretofore the heels when placed between the holding plates of the jack of the turning machine have depended only upon the grasp of smooth surfaces upon the said jack plates against the smooth surfaces of the ends of the heel to hold the heel securely in the jack against the forceful twisting action of the cutter knives engaging the heel.

It is to overcome these two defects that I have provided as part of the operation of making turned heels for the making of the guiding and holding recesses A, A in the larger or lower end of the heel and the single guiding and holding recess B in the smaller end or so-called top of the heel. These guiding and holding recesses having been provided as already described in a very accurate way in prior steps in the operation of making the heel, the said recesses are present when the heels come to the turning machine. The upper jack plate 111 is provided with a single downwardly projecting pin 113 properly located to fit the single guiding and holding recess B in the small end or top of the heel as appears most plainly in Fig. 23. The lower holding plate 112 of the jack has its upper surface convex to fit the heel to be received therein and particularly is provided with two upstanding spaced pins 114 accurately located and sized to fit the two recesses A provided upon the larger end of the heel.

These recesses accordingly act as guiding recesses enabling the operator of the turning machine to accurately and properly place the heel in proper position in the jack of the turning machine as by placing the heel so that its recesses A, A will have fit thereinto the upstanding pins 114 of the lower jack plate when the heel is placed against said lower plate. As these pins project upwardly an appreciable distance the operator can tell by sight and touch whether or not the heel fits down closely onto the plate with the pins 114 of the plate sticking into the heel. Similarly when the relatively movable upper plate 111 is brought down against the small end or top end of the heel the operator can readily determine whether the heel has had its single recess B entered by the downwardly projecting pin 113 of the top plate 111. If the plate is not down snugly against the top of the heel the operator is accordingly given a warning and can adjust the heel sidewise or back and forth until the pin 113 does enter the recess B.

As these recesses were originally placed in the heel very accurately they enable the heel to be placed in the turning machine with much greater certainty and accuracy than has heretofore been possible. Furthermore, after the pins and recesses have served to guide the operator into placing the heel in the proper position the interengagement of the upper and lower pins with their corresponding receses B and A serve as positive holding means to prevent the heel being forced out of position by the blade of the cutting knife when the turning operation takes place. It will be noted that the provision of three such holding pins and holding recesses obtains a three-point grasp or bearing of the heel relative to the turning jack which positively prevents any displacement of the heel relative to the jack or any rotating of the heel relative to the jack as will be apparent from Fig. 24.

These guiding and holding recesses A and B have performed their function by the time the heel has been turned. The putting on to the small end of the heel of the so-called top layer 16 as shown in Figs. 8 and 9 covers up the single guide recess B in that end of the heel. The placing of the heel upon the shoe as shown in Fig. 9 covers up the two guide recesses A. It is not necessary to fill up the cavity of either set of these recesses.

*Babbitt base plate*

By reference to Figs. 22, 23, 24, and 25 it will be seen that the lower jack plate 112 is somewhat smaller than the concave surface of the large end of the heel and that this heel-holding jack 107 is provided below the said lower plate 112 with a base plate 127 which extends out at the sides and back of the heel beyond the lower plate 112 to the precise outline of the sides and back of the heel and in turn rests upon the main base 129 of the heel-holding jack. As far as I am informed it is new to provide such a base plate as this 127 extending out at the sides and back fully to the extreme edge of the sides and back of the heel in its turned state. Heretofore the heel-holding jack 107 has been provided simply with the equivalent of my lower jack plate 112 and the outer edges of the heel at its sides and rear have been unsupported. The practical reason for this has been that any ordinary metallic supporting member could not be brought near the finished edge of the heel for fear of the knives of the cutters making contact with such plates and being dulled and seriously injured by engaging such steel or iron plates. I have found, however, that if this iron or steel lower plate 112 was even slightly back from the ultimate turned edge of the heel the side and back edges of the heel would be frayed or distorted after contact with the blades of the cutter because the leather of the heel at these edges usually forms an angle of less than ninety degrees and was not sufficiently supported to stand the cutting action of the cutters without said edge being frayed, distorted or bent back. I have overcome this difficulty by providing a base plate 127 made of babbitt or similar metal composition that is rigid and hard enough to support the extreme edge of the leather heel but is soft enough and otherwise of such character that it can be safely carried to the very edge of the finished heel without danger of injuring the knives of the cutters. Consequently I make the said base plate 127 of exact size, curve and taper to fit the outline of the finished or turned heel. In this way as the cutter engages the heel it turns off the excess leather down to the desired form and shape and taper of the heel and thus the sides and rear edges of the said base plate 127 of the babbitt supports the leather of the heel right out to the extreme edge of the sides and back of the heel. This avoids the previous defect found in some of these heels of these edges being ragged, frayed or not sharply cut to true shape. If the ordinary engagement of the knives of the cutter with the heel should on any adjustment bring the cutter blades into engagement with the babbitt base plate the knives would simply cut away the babbitt to the adjusted shape that the cutter would be cutting the heel to and no damage would be done to the heel nor to the knives of the cutter. This is because the babbitt is soft enough to be cut by the hard steel blades of the cutter. In fact I have found it practicable and workable to place the base plate 127 on the jack and advance the jack against the cutters when the turning machine has been adjusted to make a given shape of heel and thus deliberately use the knives of the cutter of the turning machine to trim the base plate 127 to the precise shape that will exactly fit the side and rear edges of the heels that are to be turned on the machine.

*Separate riser to add height to heel*

Sometimes heels are required of greater height than those herein already described and of a height greater than is made by adding on a top lift 16 to a clinch-nailed heel such as can practically be handled in the heel-compressing and nail-clinching machine as shown in Figs. 17 and 18. Instead of radically readjusting said heel-compressing and nail-clinching machine or having that elaborate machine rebuilt to adapt it to compress higher heels I have provided for adding a riser or spacer 115 as shown in Fig. 26 to accomplish the purpose in hand. I have also provided mechanism and will point out steps in the process of making a heel having the advantages required.

The riser 115 consists of enough layers of heel-forming material to add the required height to the heel and these layers are preferably glued to each other so as to be handled as a unit. The riser is then nailed to the top or small end of the clinch-nailed heel such as is shown in Fig. 6 by a few nails 116 passing down from the outer face of the riser and through all of its layers and into the body of the clinch-nailed heel resulting in a structure as shown in Fig. 26. It will be understood that as indicated in Fig. 26 above, the main heel which is already clinch-nailed and the riser 115 are still in the rough form and have to be subjected to a turning operation in the turning machine as already described above. As a step towards guiding and holding this heel with its added riser I provide a single guiding and holding recess C in the outer face of the riser 115 more or less as shown in Fig. 26. It will be obvious that the putting on of the riser or spacer 115 covers up the regular guiding and holding recess B but the providing of the single recess C in the outer surface of the riser enables the heels to which the risers are added with the said guiding and holding recess C, to be placed in the jack of the turning machine accurately and held therein positively in the same manner as has already been described with the recesses A and B. The heel provided with a riser 115 will have as its guiding recesses of course the two recesses A at the large end of the heel and the new guiding and holding recess C at the top or small end of the heel. It will be understood of course that the nails 116 used to fasten the riser 115 upon the main body of the heel will be purposely located out of alignment with any of the clinching nails 14. A convenient and effective way of accomplishing this is shown in Fig. 26 in that the shorter nails 116 are placed closer to the center line of the heel and so inside the spaced ends of the U-shaped row of nails 14. In practice only three or four nails as 116 are used. In the heel shown in Fig. 26 and in the mechanism for producing the same shown in Figs. 27 and 28 three nails 116 are used. One of these nails may conveniently be nearer the breast of the heel than are any of the nails 14. The putting of these three nails 116 thus towards the center line of the heel and as a whole closer to the breast of the heel than to the back of the heel is partly to avoid the nails 14 already in the body of the heel and also partly due to the fact that the spacer or riser 115 will usually be trimmed down in the turner to ultimately be of relatively small cross area in that heels having the extra height usually have the top or small end of the heel proportionately smaller.

Fig. 27 is a vertical sectional view through a machine built to nail the spacer 115 to the heel and at the same time to form the guiding and holding recess C. Upon the bench or table 117 are provided suitable upstanding guides or gages 117ᵃ at the back of the heel and 117ᵇ at the breast of the heel to guide and hold the riser and heel in proper position for this operation. Ordinarily a layer of adhesive as glue will be applied to one or both of the interengaging faces of the riser and clinched heel just before this nailing operation is performed. Extending down through the table from its upper lever is secured the guiding cylinder 118 in which is secured the nail-holding and guiding unit consisting of the sleeve 119 having its central bore of decreasing size as it extends upwardly and the correspondingly reversely tapered central plug 120. In the periphery of this central plug are three nail-holding recesses 121 and in the center of the plug 120 is the single longitudinal hole 122 of larger diameter. Slidingly mounted in the said nail-holding recesses 121 are placed the push rods 123. Similarly slidingly mounted in the larger central bore 122 is placed the punch 124 for forming the single holding and guiding recess C. The view Fig. 27 shows this machine with its parts in the position they occupy immediately before the nail-driving operation takes place. The nails 116 it will be understood have been placed point upwards in the upper portion of the recesses 121 before the riser 115 and the heel have been placed in the machine. After the heel and its riser have been so placed in the machine an anvil member 125 having its lower face shaped to fit the large bottom end of the heel is placed above the heel and securely held in place by suitable means (not necessary to be shown). Spaced downward from the lower end of the nail-holding device composed of the sleeve 119 and the plug 120 there is located in the cylinder 118 the plunger 126. At the lower position of this plunger as shown in Fig. 27 its upper end holds the push rod 123 in proper position to allow the nails 116 to be placed in the holes thereabove without their points projecting above the parts holding the nails. Similarly the plunger 126 holds the punch 124 in proper relative position. Upward powerful movement of the plunger 126 by suitable means (not shown) drives the rods 123 upward through the recesses 121 and thereby the nails 116 are driven upwardly through the riser 115 and into the body of the heel. During the last part of this movement of the plunger the punch 124 has been moved up so as to enter the external face of the riser for a short distance namely sufficient to make the guiding and holding recess C. As appears in Fig. 27 the punch 124 has its upper end spaced considerably down from the heel riser at the stage of operation shown in Fig. 27 so that the upper end of the punch will not be brought into operation until nearly the end of the stroke of plunger 126. The anvil 125 is then removed and the plunger 126 depressed which allows the push rods 123 and the punch 124 to fall by gravity in their respective holes and the heel with its risers then removed from the machine. The clinched heel with its permanently fixed riser is then ready to be placed in the turning machine and the new guiding and holding recess C co-operates with a pin 113 in the top plate 111 of the jack of that machine.

It will be noticed that in the heel shown in

Fig. 26 the recess C is not in vertical alignment with the guiding recess B. Such alignment is not necessary and commonly it is preferable to have the recess C farther towards the breast of the heel as shown in Fig. 26 in order to accommodate the gradually reducing size of the heel when equipped with a riser. It will be understood of course that when the turning machine is to operate upon a riser-equipped heel where the recess C is not in vertical alignment with the recess B the top plate 111 of the turning machine will have its pin 113 located correspondingly closer to the breast of the heel so as to maintain the proper position of the heel in the turning machine. This modification is readily accomplished by having another set of top plates with the holding pin correspondingly placed according to the position of the recess C.

What I claim as new and desire to secure by Letters Patent is:

1. The process of making separate, built-up, reenforced, turned heels which consists in assembling a plurality of lifts of heel-forming material, compressing and fastening said lifts together with adhesive, forming in the exterior face of the top lift an accurately located guiding and holding recess, forming two such recesses in the exterior face of the bottom lift, forming a series of nail-receiving holes entering the top lift of the assembled heel and extending through most of the intermediate lifts towards the bottom lift, providing an anvil member shaped to fit against the exterior face of the bottom lift of the heel, said anvil face being provided with projecting guide pins to enter the guide recesses in said bottom lift and with a groove to receive the projecting point ends of the re-enforcing nails, placing and holding said anvil member against the exterior face of the bottom lift with the guide pins of the anvil engaging said guide recesses of the bottom lift whereby the anvil is held in proper position relative to the heel, driving into said holes nails longer than the height of the heel adjacent the respective nails until the heads of the nails are embedded in the top lift and the points of the nails have come through the bottom lift into the groove of the anvil, clinching the projecting point ends of the nails over into said bottom lift, providing a projecting guide pin in the top holder plate of the jack of a turning machine and two projecting guide pins in the bottom holder plate of said jack, placing the re-enforced heel in the jack with the top and bottom guide pins engaging respectively the top and bottom guide recesses of the heel and subjecting the heel so held to the action of the turning machine.

2. The process of making separate, built-up, reenforced, turned heels which consists in assembling a plurality of lifts of heel-forming material, compressing and fastening said lifts together with adhesive, forming in the exterior face of the top lift an accurately located guiding and holding recess, forming two recesses in the exterior face of the bottom lift, forming a series of nail-receiving holes entering the top lift of the assembled heel and extending through most of the intermediate lifts toward the bottom lift, providing an anvil member shaped to fit against the exterior face of the bottom lift of the heel, said anvil face being provided with projecting guide pins to enter the guide recesses in said bottom lift and with a groove to receive and partly deflect the projecting point ends of the re-enforcing nails, placing and holding said anvil member against the exterior face of the bottom lift with the guide pins of the anvil engaging said guide recesses of the bottom lift whereby the anvil is held in proper position relative to the heel, driving into said holes nails longer than the height of the heel adjacent the respective nails until the heads of the nails are embedded in the top lift and the points of the nails have come through the bottom lift into the groove of the anvil and have been partly deflected thereby, clinching the projecting point ends of the nails over into said bottom lift, providing a projecting guide pin in the top holder plate of the jack of a turning machine and two projecting guide pins in the bottom holder plate of said jack, placing the re-enforced heel in the jack with the top and bottom guide pins engaging respectively the top and bottom guide recesses of the heel and subjecting the heel so held to the action of the turning machine.

3. The process of making separate, built-up, reenforced, turned heels which consists in assembling a plurality of lifts of heel-forming material, compressing and fastening said lifts together with adhesive, forming two accurately located guiding and holding recesses in the exterior face of the bottom lift, forming a series of nail-receiving holes entering the top lift of the assembled heel and extending through most of the intermediate lifts towards the bottom lift, providing an anvil member shaped to fit against the exterior face of the bottom lift of the heel, said anvil face being provided with projecting guide pins to enter the guide recesses in said bottom lift and with a groove to receive the projecting point ends of the reenforcing nails, placing and holding said anvil member against the exterior face of the bottom lift with the guide pins of the anvil engaging said guide recesses of the bottom lift whereby the anvil is held in proper position relative to the heel, driving into said holes nails longer than the height of the heel adjacent the respective nails until the heads of the nails are embedded in the top lift and the points of the nails have come through the bottom lift into the groove of the anvil, clinching the projecting point ends of the nails over into said bottom lift, providing two projecting guide pins in the bottom holder plate of the jack of a turning machine, placing the re-enforced heel in the jack with the bottom guide pins engaging the bottom guide recesses of the heel and subjecting the heel so held to the action of the turning machine.

4. The process of making separate, built-up, reenforced, turned heels which consists in assembling a plurality of lifts of heel-forming material, compressing and fastening said lifts together with adhesive, forming two accurately located guiding and holding recesses in the exterior face of the bottom lift, forming a series of nail-receiving holes entering the top lift of the assembled heel and extending through most of the intermediate lifts towards the bottom lift, providing an anvil member shaped to fit against the exterior face of the bottom lift of the heel, said anvil face being provided with projecting guide pins to enter the guide recesses in said bottom lift and with a groove to receive and partly deflect the projecting point ends of the re-enforcing nails, placing and holding said anvil member against the exterior face of the bottom lift with the guide pins of the anvil engaging said guide recesses of the bottom lift whereby the anvil is held in proper position relative to the heel, driving into said holes nails longer than the height of the heel adjacent the respective nails until the heads of the nails are embedded in the top lift and the points of the nails have come through the bottom lift into the groove of the anvil and have been partly deflected thereby, clinching the projecting point ends of the nails over into said bottom lift, providing two projecting guide pins in the bottom holder plate of the jack of a turning machine, placing the re-enforced heel in the jack with the bottom guide pins engaging the bottom guide recesses of the heel and subjecting the heel so held to the action of the turning machine.

WILLIAM HUBBARD.